G. L. PATTERSON.
BATTERY BOX AND HOLDER.
APPLICATION FILED DEC. 1, 1908.
924,577.
Patented June 8, 1909.
4 SHEETS—SHEET 1.
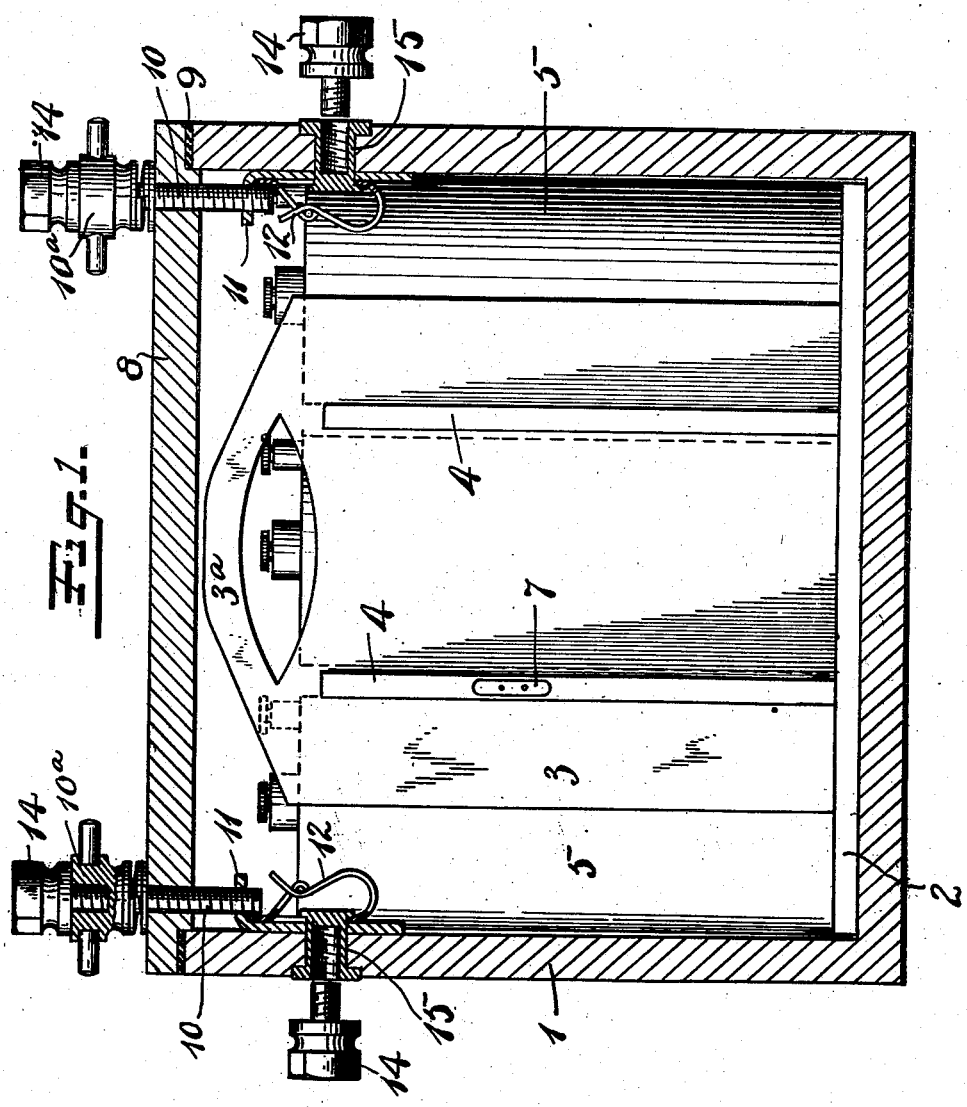
Witnesses:
Inventor
G. L. PATTERSON
By his Attorneys

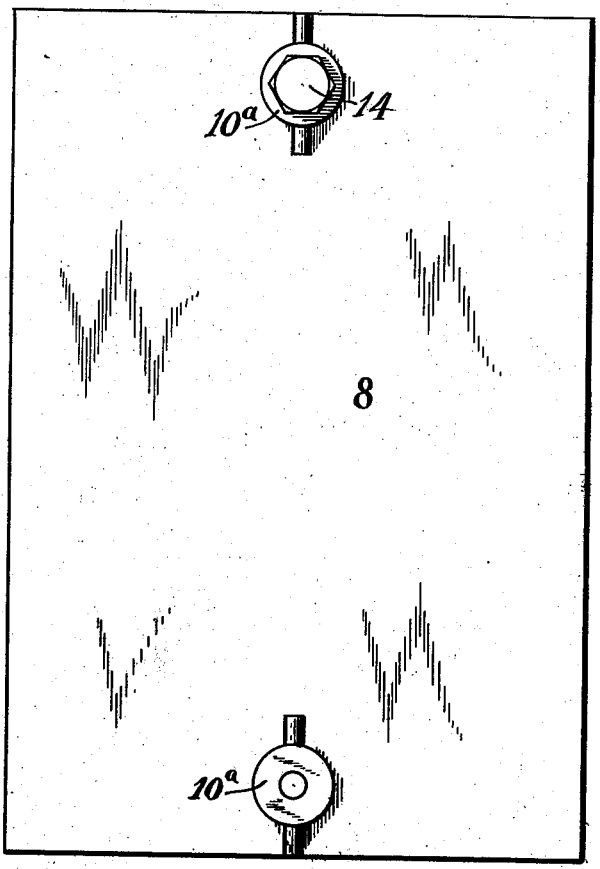

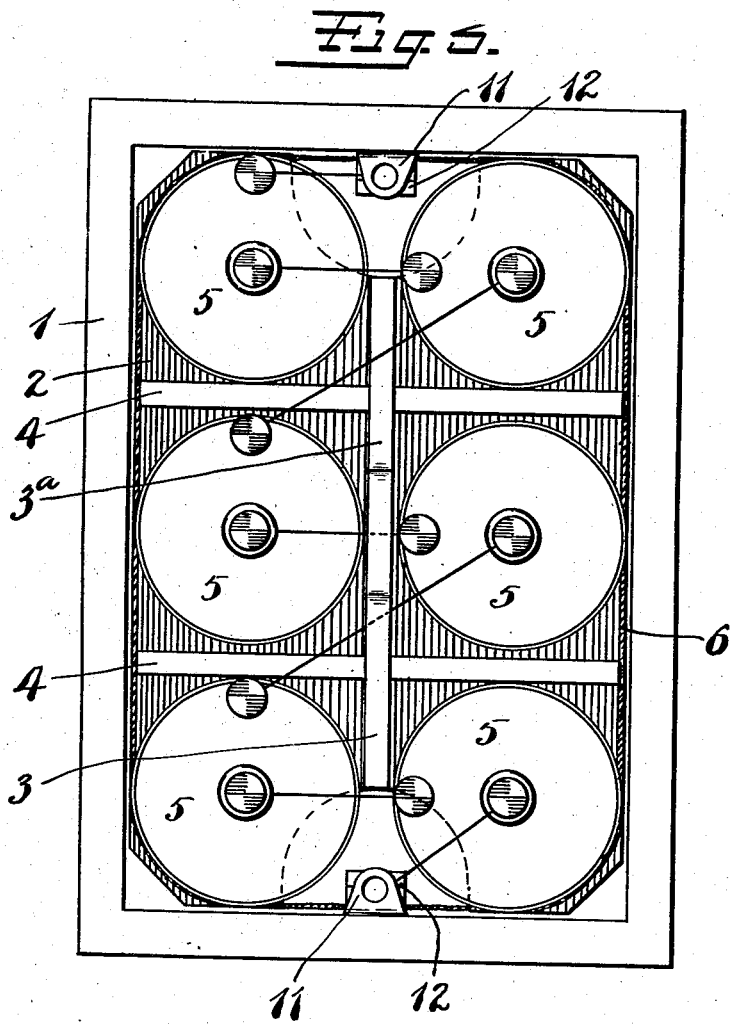

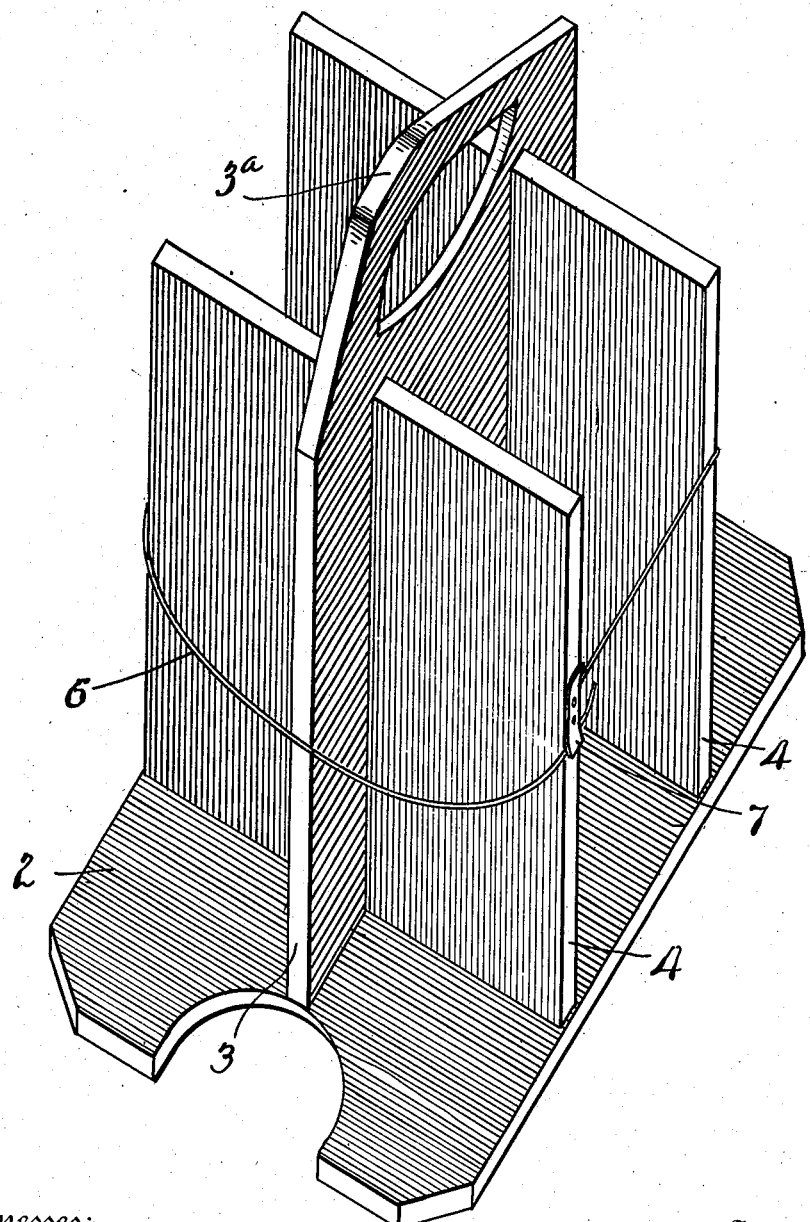

UNITED STATES PATENT OFFICE.

GEORGE LEWIS PATTERSON, OF NEW YORK, N. Y., ASSIGNOR TO ALICE C. PATTERSON, OF NEW YORK, N. Y.

BATTERY BOX AND HOLDER.

No. 924,577.            Specification of Letters Patent.            Patented June 8, 1909.

Application filed December 1, 1908. Serial No. 465,558.

*To all whom it may concern:*

Be it known that I, GEORGE LEWIS PATTERSON, citizen of the United States, residing at the city of New York, county and State of New York, have invented certain new and useful Improvements in Battery Boxes and Holders, of which the following is a full, clear, and exact description.

My invention relates to an improved battery box and holder, the purpose of the invention being to provide a simple, inexpensive and compact means for holding a group of battery cells in such a manner that they may be easily removed from a suitable closure, the same coöperating with the cell basket or holder in such a manner that the various connections may be made with the greatest ease and facility.

Other advantages will be seen and recognized by the mechanic skilled in this art.

In the drawings, Figure 1 is a side elevation of my improved battery holder, the box being shown mainly in section. Fig. 2 is a plan view of the box. Fig. 3 is a plan view with the box cover removed. Fig. 4 is a plan view of the holder or cell basket detached and with the cells absent.

1 is a box of suitable outline to receive what I term the cell holder or basket. This basket comprises a base or floor 2, with upright partitions 3—4. The partition 3 in this instance runs lengthwise of the floor 2, while the partitions 4 (two being shown in this instance) extend cross-wise of the floor 2 and intersect and reinforce the partition 3. One of the partitions (in this instance the partition 3) is bowed up at its upper end to form a central handle 3ª, which is arranged above the tops of the cells (when the latter are in place) to permit the user to grasp the basket and lift it out of the box or container. As will be seen by the floor and partition arrangement of the basket, a plurality of stalls are provided, each of which may contain a battery cell 5. In the form shown, six stalls are provided. In the preferred form, the outer side of all of the stalls is open, so that the several battery cells may be very easily inserted.

6 represents a strap, cord or equivalent binder, which may be tied around the group of cells, after the same are in place, to hold them securely in the several stalls of the basket.

If desired, one edge of one partition may be provided with a cleat 7 to facilitate the ready attachment of the binder when the same is in the form of a cord.

From the foregoing, it will be seen that the removable basket permits the ready and quick assembling of all of the cells before the same are introduced into the box, thus enabling all battery binding post connections to be conveniently made, while the cells are in a position to be easily manipulated. When the cells are all properly in place and connected (one method of connection being illustrated in Fig. 3 by the lines leading from the terminal of one cell to the opposite terminal of an adjacent cell, and so on) the user grasps the basket by the handle 3ª and lowers it into the box 1. He then makes the end connections and applies the cover 8, which may be suitably rabbeted to fit the box properly and which may be also sealed by means of a gasket 9 extending around the line of junction, said gasket being illustrated in section, Fig. 1.

The cover may be conveniently secured by means of fastening screws 10, which take into stanchions 11 secured to the inner side of the box in such a manner as to register properly with the ends of the screws 10—10. The outer end of each screw 10 may have a handle 10ª by which the screw may be turned down to clamp the cover 8 securely to the box. Connected to the stanchion 11 may be a binding post or connector 12, for example of the clip variety, to afford a quick and easy connection for the end cells. The rise of the handle 3ª of the basket may be such as to lie closely under the cover 8, thereby preventing the basket from jarring up and down. The floor of the basket is so proportioned as to fit neatly within the box 1, thus preventing lateral displacement and jarring incidental thereto. The basket floor and end partitions should be cut away slightly to permit the basket to be raised and lowered in the box when the cover is off, said cut-away portions affording clearance for the stanchions 11 and clips 12. When the cells are connected together and the end cells are connected to the clips 12—12, the screws 10—10 will be in circuit. The usual conducting wires may now be connected to these screws 10 in any suitable manner, but by preference I provide a tapped hole in the upper end of each screw handle 10ª, and I then provide a binding post such as illustrated at 14, comprising a head and a screw-threaded shank adapted to fit the threaded opening in the handle 10ª, one binding post being provided for each head 10ª. This affords one convenient outlet for the current but I am enabled to provide another very simple outlet. This second outlet is effected by providing two posts 15—15 connected at their inner ends to the stanchions 11—11, and projecting through the ends of the box 1, and lying flush or substantially flush with the surface thereof. These posts are partially bored and threaded to receive the binding screws 14 so as to constitute (when said screws are in place and in conjunction with said screws) a second set of binding posts, whereby the user may readily attach the outgoing circuit wires to the ends of the box 1 rather than to the handles 10ª—10ª. By having this alternative arrangement and making it optional with the user, whether the wires are connected to the removable cover or to the fixed box 1, the user may suit his convenience in making his external connections. In some instances it might be desirable not to have the outgoing terminal wires connected to a removable cover, in which instance these wires could be connected with the binding clips 12—12 through the medium of the posts 15 at the ends of the box. By making the binding element 14 in the form of a screw, instead of in the form of a nut, fragile projections from the ends of the box or from the upper ends of the handles 10ª are avoided.
What I claim is:

1. In a battery, a box, a separate cell basket removably carried thereby and adapted to the interior of said box and comprising a plurality of stalls each open at the top and one side and each arranged to receive a battery cell, and means for holding said battery cells in place in said basket.

2. In a battery, a box, a battery carrier adapted to the interior of the box and removable therefrom, a cover for said box, means for holding said cover in place, terminals carried by said box and having extensions in electrical communication with said cover holding means and a binding post arranged to make electrical connection with said terminal through said cover holding means.

3. In a battery, a box, a battery carrier adapted to the interior of the box and removable therefrom, a cover for said box, means for holding said cover in place, terminals carried by said box and having extensions in electrical communication with said cover holding means, a connector arranged to make electrical connection with said terminal through said cover holding means and through the side of the box.

4. In a battery, a box, a battery cell carrier adapted to the interior of the box and removable therefrom, a removable cover for the box, said cover coöperating with the carrier to prevent looseness of the latter when the box is closed, and separate means to hold battery cells from becoming loose in the carrier.

GEORGE LEWIS PATTERSON.

Witnesses:
R. C. MITCHELL,
M. E. GARRETT.